(12) United States Patent
Kanduri et al.

(10) Patent No.: US 8,700,592 B2
(45) Date of Patent: Apr. 15, 2014

(54) SHOPPING SEARCH ENGINES

(75) Inventors: Satya Pradeep Kanduri, Redmond, WA (US); Marcelo De Barros, Redmond, WA (US); Mikhail Parakhin, Redmond, WA (US); Cynthia Yu, Redmond, WA (US); Qiang Wu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 12/757,095

(22) Filed: Apr. 9, 2010

(65) Prior Publication Data
US 2011/0252012 A1  Oct. 13, 2011

(51) Int. Cl.
*G06F 17/30* (2006.01)

(52) U.S. Cl.
USPC ............................................ 707/706; 707/723

(58) Field of Classification Search
USPC ................................................ 707/706, 723
See application file for complete search history.

(56) References Cited

U.S. PATENT DOCUMENTS

| | | |
|---|---|---|
| 6,463,428 B1 | 10/2002 | Lee et al. |
| 6,983,236 B1 | 1/2006 | Karlovac et al. |
| 7,038,680 B2 | 5/2006 | Pitkow |
| 7,499,764 B2 | 3/2009 | Fukui |
| 7,546,287 B2 | 6/2009 | Subramaniam et al. |
| 7,634,474 B2 | 12/2009 | Vassilvitskii et al. |
| 2002/0140745 A1 | 10/2002 | Ellenby et al. |
| 2006/0064411 A1 | 3/2006 | Gross et al. |
| 2006/0294509 A1 | 12/2006 | Mital et al. |
| 2008/0152231 A1 | 6/2008 | Gokturk et al. |
| 2008/0288482 A1 | 11/2008 | Chaudhuri et al. |
| 2009/0106232 A1* | 4/2009 | Burges et al. ................ 707/5 |
| 2009/0125482 A1 | 5/2009 | Peregrine et al. |
| 2009/0187516 A1 | 7/2009 | Kanungo et al. |
| 2009/0210388 A1 | 8/2009 | Elson et al. |
| 2009/0319507 A1 | 12/2009 | Chen et al. |

(Continued)

FOREIGN PATENT DOCUMENTS

| | | |
|---|---|---|
| WO | 2008078321 A2 | 7/2008 |
| WO | 2009154484 A2 | 12/2009 |

OTHER PUBLICATIONS

Ghose et al., "An Empirical Analysis of Search Engine Advertising: Sponsored Search in Electronic Markets," Management Science, Oct. 2009, http://pages.stern.nyu.edu/~aghose/paidsearch.pdf, pp. 1605-1622.

(Continued)

*Primary Examiner* — Rehana Perveen
*Assistant Examiner* — Alexander Khong
(74) *Attorney, Agent, or Firm* — Dave Ream; Jim Ross; Micky Minhas

(57) ABSTRACT

A web search system uses humans to rank the relevance of results returned for various sample search queries. The search results may be divided into groups allowing training and validation with the ranked results. Consistent guidelines for human evaluation allow consistent results across a number of people performing the ranking. After a machine learning categorization tool, such as MART, has been programmed and validated, it may be used to provide an absolute rank of relevance for documents returned, rather than a simple relative ranking, based, for example, on key word matches and click counts. Documents with lower relevance rankings may be excluded from consideration when developing related refinements, such as category and price sorting.

19 Claims, 6 Drawing Sheets

(56) References Cited

U.S. PATENT DOCUMENTS

| | | | |
|---|---|---|---|
| 2009/0322739 | A1 | 12/2009 | Rubin et al. |
| 2009/0326872 | A1 | 12/2009 | Rubin et al. |
| 2009/0326947 | A1 | 12/2009 | Arnold et al. |
| 2010/0011025 | A1 | 1/2010 | Zheng et al. |
| 2010/0079336 | A1 | 4/2010 | Skibiski et al. |
| 2010/0131254 | A1 | 5/2010 | Rubin et al. |
| 2010/0145976 | A1 | 6/2010 | Higgins et al. |
| 2010/0250527 | A1* | 9/2010 | Gnanamani et al. .......... 707/726 |
| 2011/0004609 | A1* | 1/2011 | Chitiveli et al. .............. 707/759 |
| 2011/0040753 | A1 | 2/2011 | Knight |

OTHER PUBLICATIONS

Vallet et a., "Inferring the Most Important Types of a Query: a Semantic Approach," SIGIR'08, Jul. 2008, http://research.yahoo.com/files/sigir08-poster.pdf.

Zaragoza et al., "Web Search Relevance Ranking," Sep. 2009, http://research.microsoft.com/pubs/102937/EDS-WebSearchRelevanceRanking.pdf.

Vassilvitskii et al., "Using Web-Graph Distance for Relevance Feedback in Web Search," SIGIR'06, Aug. 2006, http://citeseerx.ist.psu.edu/viewdoc/download?doi=10.1.1.90.7825&rep=rep1 &type=pdf.

Ghose, et al., "An Empirical Analysis of Search Engine Advertising: Sponsored Search In Electronic Markets", Management Science, Retrieved at: <<http://pages.stem.nyu.edu/~aghose/paidsearch.pdf >>, Oct. 2009, pp. 1605-1622.

Vallet, et al., "Inferring the Most Important Types of a Query: a Semantic Approach," SIGIR'08, Retrieved at:<<http:// research.yahoo.com/files/sigir08-poster.pdf>>, Jul. 2008.

Zaragoza et al., "Web Search Relevance Ranking", Retrieved at: <<http://research.microsoft.com/pubs/102937/EDS-WebSearchRelevanceRanking.pdf>>, Sep. 2009.

Vassilvitskii, et al., "Using Web-Graph Distance for Relevance Feedback in Web Search", SIGIR'06, Retrieved at: <<http://citeseerx.ist.psu.edu/viewdoc/download?doi=10.1.1.90.7825&rep=rep1 &type=pdf.>>, Aug. 2006.

"Google Chart Tools", Copyright 2010 Google, pp. 2.

Goix, et al., "Situation Inference for Mobile Users: a Rule Based Approach", IEEE, Copyright 2007, pp. 299-303.

Kraak, Menno-Jan, "Cartography and Geo-Information Science: An Integrated Approach", Eighth United Nations Regional Cartographic Conference for the Americas, New York, Jun. 27-Jul. 1, 2005, Item 8 (b) of the provisional agenda. ITC—International Institute of Geo-Information Science and Earth Observation (Netherlands), May 23, 2005, pp. 1-12.

Yu, "A System for Web-Based Interactive Real-Time Data Visualization and Analysis", 2009 IEEE Conference on Commerce and Enterprise Computing, Retrieved at: <<http://www.computer.org/portal/web/csdl/dio/10.11.1109/ CEC.2009.26, Jul. 20-23, 2009, p. 1.

Coputinho, et al., "Active Catalogs: Integrated Support for Component Engineering", Retrieved at: <<http://lwww.isi.edulmassIMuriloHomePBflelPublicationsIDownloadStuff/naner9.pdf, Proc. DETC98: 1998 ASME Design Engineering Technical Conference, Sep. 13-16, 1998, pp. 9.

Uren and Motta, "Semantic Search Components: a blueprint for effective query language interfaces", Retrieved at: <<http://www.aktors.org/publications/selected-papers/2006-2007/205-220.pdf, Advanced Knowledge Technologies, 2006, pp. 205-220.

Purdue University, "Mobile Analytics—Interactive Visualization and Analysis of Network and Sensor Data on Mobile Devices", PURVAC Purdue University Regional Visualization and Analytics Center, RVAC Regional Visualization and Analytics Centers.

Sashima, et al., "Consorts-S: A Mobile Sensing Platform for Context-Aware Services", IEEE, ISSNIP 2008, pp. 417-422.

Yu, "A System for Web-Based Interactive Real-Time Data Visualization and Analysis", 2009 IEEE Conference on Commerce and Enterprise Computing, Retrieved at: <<http://www.computer.org/portal/web/csdl/dio/10.11.1109/CEC.2009.26, Jul. 20-23, 2009, p. 1.

Yu, et al., "A System for Web-Based Interactive Real-Time Data Visualization and Analysis", IEEE Computer Society, DOI 10.0009/CEC.2009.26, Conference on Commerce and Enterprise Computing, pp. 453-459.

Coutinho, et al., "Active Catalogs: Integrated Support for Component Engineering", Retrieved at: <<http:/lwww.isi.edulmassIMuriloHomePBflelPublicationsIDownloadStuff/naner9.pdf>>, Proc. DETC98: 1998 ASME Design Engineering Technical Conference, Sep. 13-16, 1998, pp. 9.

Pu, et al., "Effective Interaction Principles for Online Product Search Environments," Retrieved at : <<http://hci.epfl.ch/publications/2004/pu-wic.pdf>>, 2004, pp. 4.

Smith, et al., "Slack-Based Heuristics for Constraint Satisfaction Scheduling," AAAI-93, Retrieved at: <<http://www.dcs.gla.ac.uk/~chrisu/public/IdsStuff/IdsRevisited/papers/read/smithcheng.pdf>>, 1993, pp. 139-144.

Uren and Motta, "Semantic Search Components: A blueprint for effective query language interfaces", Retrieved at: <<http://www.aktors.org/publications/selected-papers/2006-2007/205-220.pdf>>, Advanced Knowledge Technologies, 2006, pp. 205-220.

Zaki and Ramakrishnan, "Reasoning about Sets using Redescription Mining," Retrieved at: <<http://www.cs.uiuc.edu/class/fa05/cs591han/kdd05/docs/p364.pdf>>, Research Track Paper KDD'05, Aug. 21-24, 2005, pp. 364-373.

* cited by examiner

SHOPPING SEARCH ENGINES

BACKGROUND

The use of search engines can leave a user with an overwhelming list of results for any given query. Some systems attempt to order the documents returned in relative order based on, for example, words in the title or number of clicks from previous searches. In the case of shopping searches, related items may be presented based on the returned documents, such as, category or price. Because the quality of the returned documents may be inconsistent, the related items may include unexpected results. For example, a shopping search on a popular search engine for the word "rose" may return documents from audio CDs to gaming consoles, with no documents for flowers even presented in the top 10 results. Shopping categories presented may range from earrings to history books.

When sorting for a particular characteristic, such as price, excessive boost given to that characteristic may cause that feature to be dominant over another at the cost of losing relevance altogether. For example, a request to order "GPS" search results by price may result in an inexpensive bracket for mounting a GPS being shown first, when that is almost certainly not what a user was looking for.

SUMMARY

A more advanced result ordering system uses machine learning techniques and human judgment to determine parameters for ordering results using an absolute relevance value of search results based on user expectations rather than a relative ordering of the returned documents based on number of clicks and/or title word match alone. Additionally, query results using the absolute ranker may be more accurately aligned in categories, allowing better suggestions for similar products or complementary products.

The absolute ranker can use the results of representative queries to provide a list of documents for that query. Human judges may rank a sample of the results for each query to provide a knowledge base for programming a machine learning categorization tool that can then capture the human-generated results for application to new queries.

The absolute ranker allows pre-screening returned results so that sorting by a characteristic does not give excessive boost to an irrelevant result.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
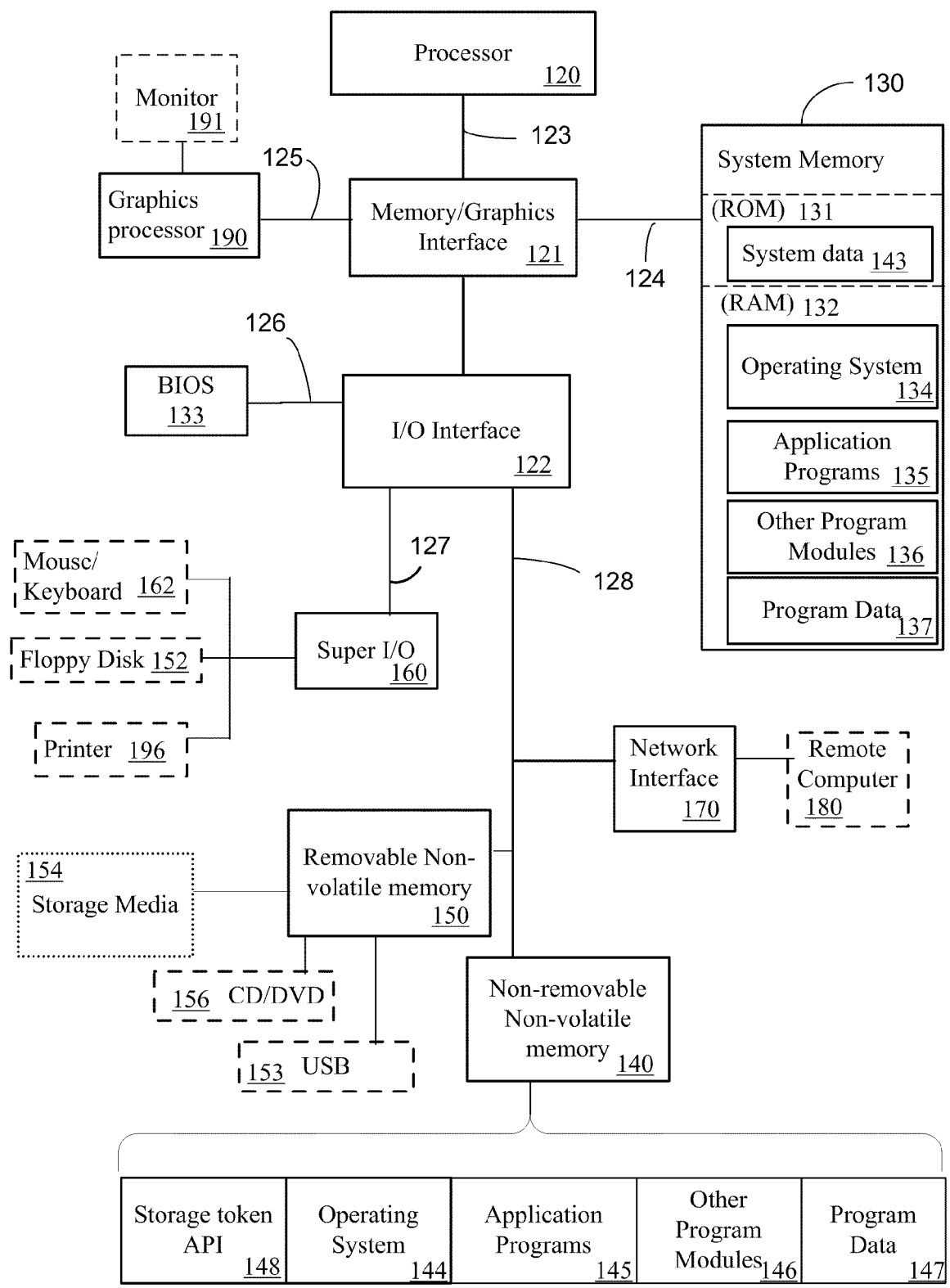
FIG. 1 is a block diagram of an exemplary computing device.

With reference to FIG. 1, an exemplary computing device for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise a computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive or may be similar to the storage media described below with respect to FIG. 2.

Removable media, such as a universal serial bus (USB) memory 153, firewire (IEEE 1394), or CD/DVD drive 156 may be connected to the PCI bus 128 directly or through an interface 150. A storage media 154 similar to that described below with respect to FIG. 2 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 2:
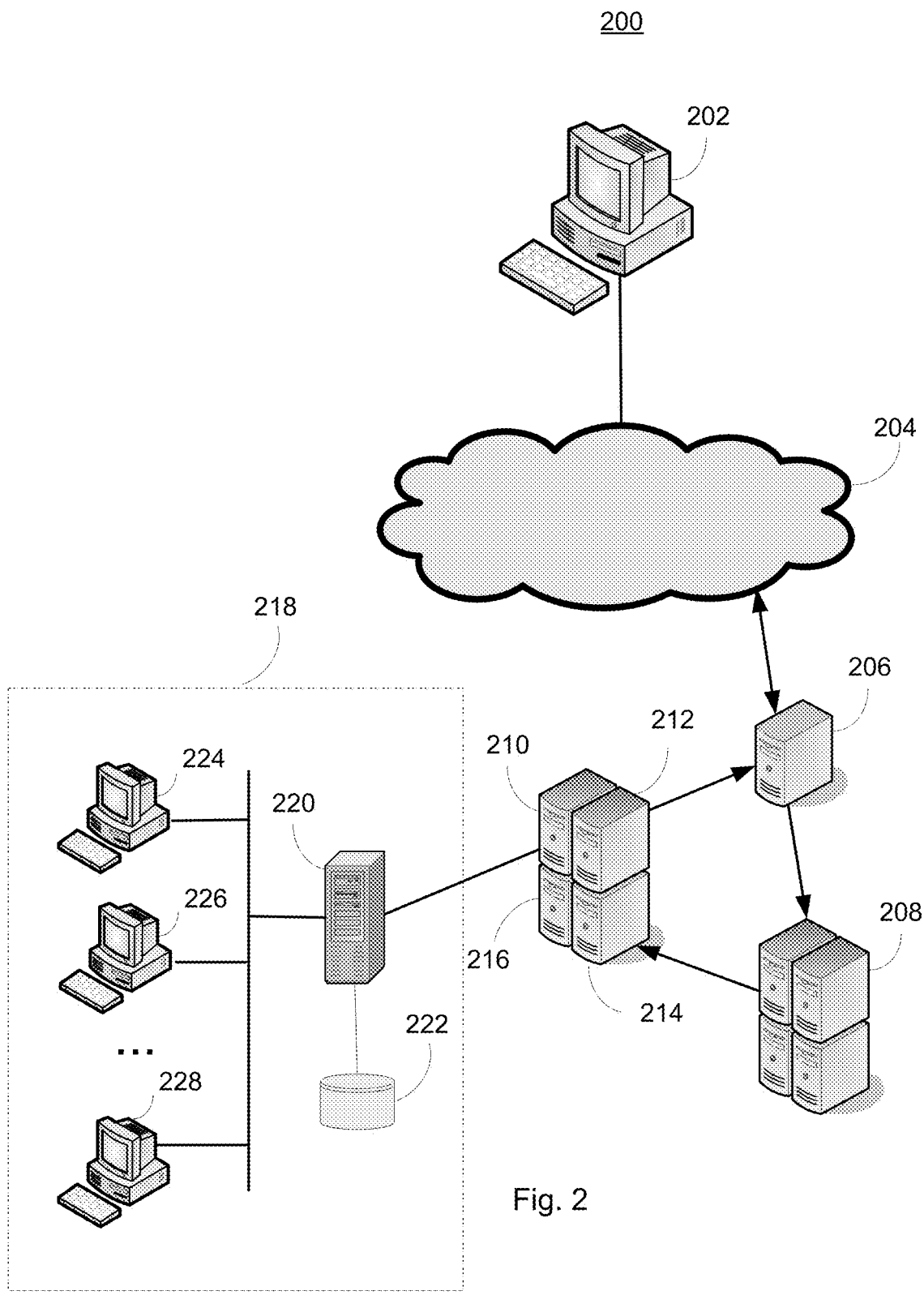
FIG. 2 is a diagram of an exemplary Internet search environment.

FIG. 2 illustrates a block diagram 200 of a web search system 200. A client computer 202 may connect to a web server 206. Traffic between the web server 206 and the client computer 202 may be carried over a network 204, such as the Internet. The web server 206 may direct search queries to a search engine 208. The search engine 208 may return results, such as a list of documents, and send those to one or more categorization tool servers, such as servers 210 and 212. Additional servers may support other functions, such as a content server 214, and a feature server 216. A categorization tool programming environment 218 may include a categorization tool development server 220, a categorization tool database 222, and a plurality of workstations 224, 226, 228, that may be used to support human judges performing ranking of return results during a programming phase. The various servers and workstations may be similar to the exemplary computer 110 of FIG. 1. Even though the description of FIG. 2 illustrates each server as performing a dedicated function, combinations of hardware and software may be used to combine or divide the functions associated with the exemplary servers described.

In operation, the Web server 206 may receive Internet search queries, such as sales-related queries, for example, related to products or services offered for sale. The search engine 208 may perform the search corresponding to the sales-related query and may return a plurality of response documents. Each response document may have accompanying text descriptions and/or photographs. The categorization tool server 210, 212 or both, may use a weighted tree search to develop an absolute relevance ranking for each of the plurality of response documents. In one embodiment, the weighted tree search may be based on a MART tree algorithm, although numerous other machine learning categorization tool products may be used. The categorization tool server 210, 212 or both, may return an absolute relevance ranking for each document returned. In one embodiment the absolute relevance rankings may be in the range from 0 to 1. An exemplary threshold level may be 0.97, although any number of threshold levels may be set, even dynamically, for example, based on a number of documents returned by the search. Documents that receive an absolute relevance ranking above the threshold level may be presented to a user in the order of their absolute relevance rank.

The content server 214 and the feature server 216 may develop related refinements for the search result presentation, such as characteristics and features of the documents.

The content server 214 may examine response documents that have an absolute relevance ranking above the threshold level and determine characteristics about each document such as, category, brand, price, etc. Because the absolute relevance rankings give a closer match to a user's expected responses compared to a relative ranker, the characteristics determined about each document, for example category, may give a narrower and more accurate category attribution. To order the categories for presentation to the user, the absolute relevance ranking for each document in a particular category may be averaged so that the category with the highest overall average may be presented on top.

The feature server 216 may extract content from the plurality of response documents selected as having absolute relevance ranks above the threshold level to develop a list of features of the document. For example, features may include price, user ratings, expert ratings, etc. as above with respect to the content server 214, the feature server 216 may operate only on those documents already determined to have absolute relevance ranks above the threshold level. As a result, a user desiring to sort documents by, for example, price, may be presented with items more in keeping with the original search that might otherwise be accomplished with only a relative ranking used in the prior art.

The categorization tool programming environment 218 may be used for training, validation, and testing of the categorization tool server 210, 212 or both, and it's machine learning program. Queries for use in the programming phase may be selected from search engine logs to provide real-world evaluation targets. The queries may be run and results extracted or "scraped" to collect documents for evaluation. A sampling of the results may be taken. For example, in one embodiment the top 20 results from the relative ranker and another 80 documents randomly selected from documents 21 through 250. The queries and the selected results for each query may be stored in the categorization tool database 222 for use on the categorization tool development server 220. The development server 220 may present the query and each of the selected results to a human judge at one of the workstations 224, 226, 228. The human judge may then rate each result with respect to his or her expectations for that query. The rating, or label, may simply be rated as excellent, good, fair, or bad. For example, an excellent label may be used if the human judge believes that there could be no better other result. A good result may be what the user might be looking for although there could be a better result. A fair label may be given if it is not what the human judge is looking for but is related. And a bad label may be assigned if the returned document has no relation to the query. In one embodiment, the labels are translated to numeric ratings 1-4, where 1 is bad and 4 is excellent. In another embodiment, the labels may be translated exponentially where 1 is given a 1, 2 is given a 4, 3 is given a 9, and 4 is given a 16. The use of exponentials creates more distance between excellent and good than between good and fair.

The human label data may be used as one element in the training. In one embodiment, the query, the document, the human assigned label (weighted or unweighted), may be combined with other features such as title match and 'click throughs,' along with other extrinsic data. A click through is a measure of how many times a document returned as a result is actually clicked on by a user. Other extrinsic data used in the training process may include but are not limited to:

NumberOfPerfectMatches_FeedsPhrase—Defined as the number of phrases which exactly match the query (words must be in the same order with no other words between them.) Note that stop words (i.e. common words like 'the' and 'of' are removed, so there will be no perfect matches for a query like 'Lord of the Dance')).

WordsInAccessoryListFeature—Words are matched to a static list of keywords that are mostly found in accessories. This is the feature that matches the number of words in query that are in this list.

MultiInstanceTotalNormalizer_FeedsPhrase—The MultiInstanceTotalNormalizer_stream is the sum of the individual word normalizers, with duplicates removed. The value of the feature is 10.0. If there are duplicate terms, each term that is a duplicate of a previous term will have a value of the MultiInstanceNormalizer_stream that is identical to the value of its parent. MultiInstanceTotalNormalizer_stream may not count duplicates.

CategoryFeature—This is the feature that matches the category of the query to the category of the document.

FirstOccurenceOfNearTuples_FeedsTerm—Offset of first occurrence of the query term in the stream. For anchor, the first occurrence is defined as the offset to the start of the first anchor phrase. Minimum query length for this feature is 1. The default value is (DocumentEnd−DocumentStart+1), instead of zero before.

StreamLength_FeedsPhrase—Length of the category stream

NumberOfTruePerfectMatches_FeedsMulti—Click prediction—a model that predicts the likelihood of a document getting clicked StaticRank—A measure of query-independent popularity of a document. Sum of clicks on the document across queries. The clicks may be decayed exponentially to give higher weight to more recent clicks.

In all, as many as 300 extrinsic data elements may be incorporated into developing and training the machine learning categorization tool.

Figure 3A:
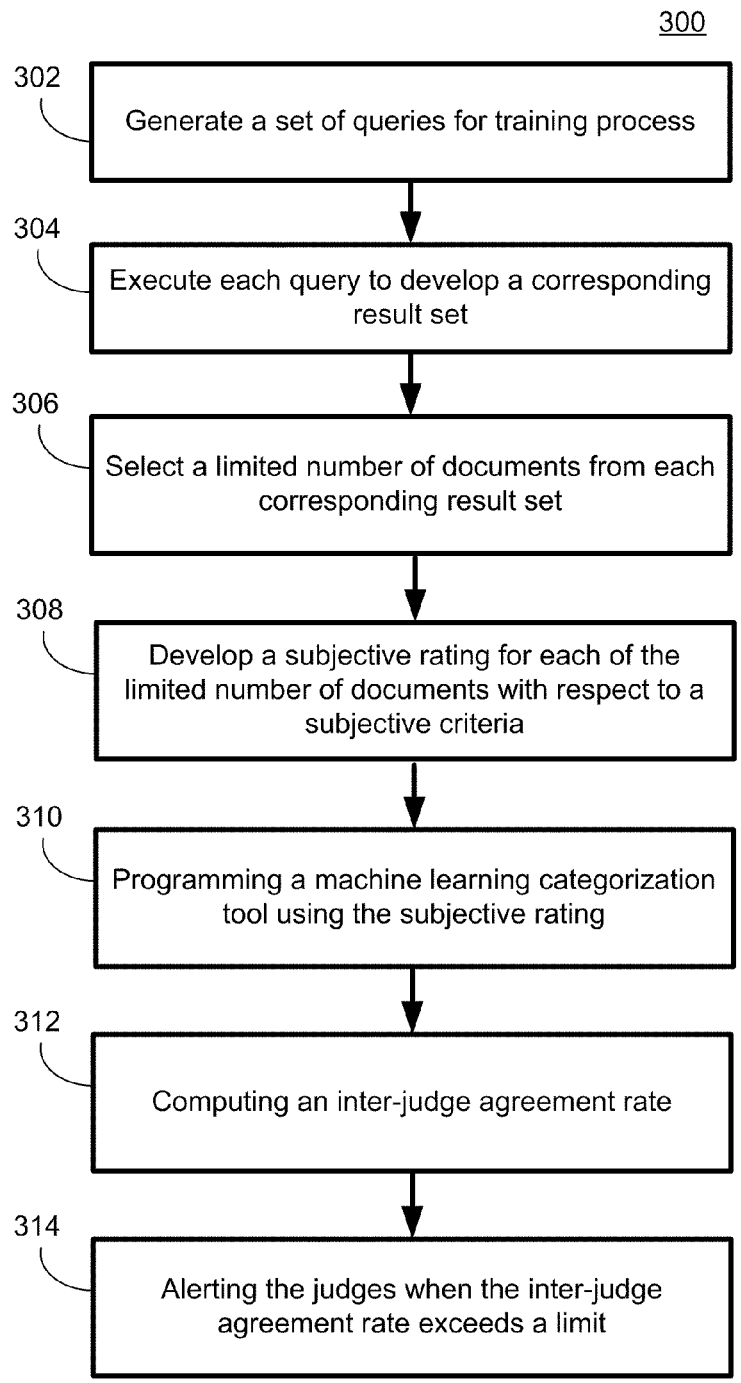
FIG. 3A is a flow chart illustrating machine learning categorization tool training.

FIG. 3A is a flow chart 300 illustrating machine learning categorization tool training. The training process involves supplying queries and their corresponding results to human judges who subjectively rank the quality of the results for a given query.

At block 302 a set of queries may be generated for use in training the machine learning categorization tool. The set of queries may be selected from queries taken from a search engine log of actual user search queries.

At block 304, the set of queries may be executed on an Internet search engine to develop a corresponding result set for each query in the set of queries.

At block 306, a limited number of documents may be selected from each corresponding result set. In one exemplary embodiment, a relative ranker may be applied to each result set. The top 20 documents as designated by the relative ranker may be selected as well as another 80 documents selected from documents ranked 21-250 as designated by the relative ranker. In this embodiment then, 100 documents may be submitted for evaluation for each query.

At block 308 a subjective rating may be developed for each of the limited number of documents as compared to its corresponding query. A number of judges may each receive the list of documents and the query and apply subjective rating. In one embodiment these ratings may be performed on a four-point basis. The subjective rating may be simply assigning a bad, a fair, a good, and a perfect rating to each document. The ratings may be translated to numerical values. For example, each document may be assigned numerical values of 1-4 respectively, or may be weighted so that the ratings translate to numerical values of 1, 4, 9, and 16, respectively. The use of weighted ratings helps increase the distance between perfect and good ratings compared to good to fair ratings.

At block 310, a machine learning categorization tool may be programmed, at least in part, using the subjective rating of each of the limited number of documents. As discussed above, additional extrinsic data elements may be incorporated into developing and training the machine learning categorization tool. In one embodiment, the machine learning categorization tool may be a multiple additive regression tree (MART) tool although other similar tools are known and perform similarly.

At block 312, to help ensure consistent results among the human judges, an inter-judge agreement rate based on the subjective rating may be developed. For example, a selected number of ratings for the same documents may be compared and a statistical divergence rating may be calculated.

At block 314, if the inter judge agreement rate falls below a limit, the human judges may be alerted and, for example, additional rating criteria may be given to the human judges to help achieve more consistent results. For example, criteria for what may be considered "related" may be better defined with respect to a "fair" rating.

Figure 3B:
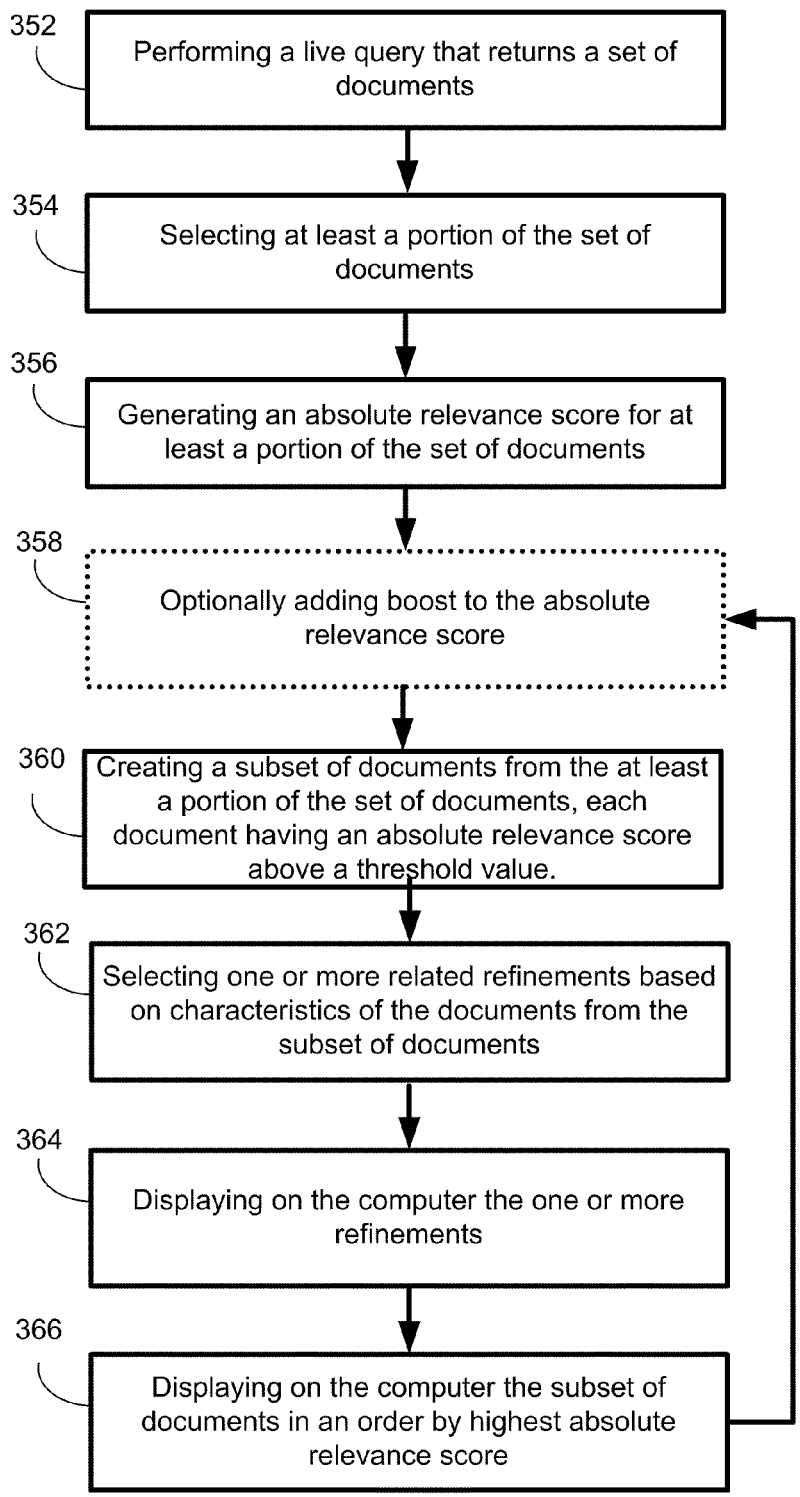
FIG. 3B is a flow chart illustrating use of a machine learning categorization tool in developing search results.

FIG. 3B is a flow chart 350 illustrating use of a machine learning categorization tool in developing search results.

At block 352, a query may be performed that returns a set of documents. The query may be an actual live query submitted by a user of a search engine, such as search engine 208 of FIG. 2.

At block 354, at least a portion of the returned set of documents may be selected for further processing. For example, a relative ranker such as that used in the prior art, may be used to provide a high-level selection of documents for further consideration. In one embodiment, the set of documents may be divided across multiple computers and a relative ranker used on each computer, whereby the top results from the relative ranking on each computer are returned for further processing. In another embodiment, the set of documents may be processed on a single computer and the top results from that relative ranking may be used. For example, 10-30% of the total documents returned may be provided to the absolute ranker, described below.

At block 356 an absolute relevance score may be provided for each document in the portion of the returned set. The absolute relevance score may be generated using a machine learning categorization tool embodied on the categorization tool server 210, 212 or both. The absolute relevance score may be a function of the human-generated labels and extrinsic data, such as described above.

At block 360, the absolute relevance score for each document of the portion of the returned the documents may be used to create a subset of documents. Each document in the subset may have an absolute relevance rating, or score, above a threshold value.

At block 362, the subset of documents may be optionally sorted according to its absolute relevance score. Whether or not the subset of documents is sorted first, one or more related refinements based on characteristics of documents in the subset of documents may be selected. Selecting one or more related refinements may include selecting a feature and/or a characteristic. The feature may include a user rating, a price, an expert rating, etc. The characteristic may include a category, a price range, and a brand.

At block 364, presentation of data to the user may begin. The presentation of the data may include displaying on a requesting computer one or more of the related refinements, and may include presenting a list of categories. The ordering of the categories may be developed by taking an average absolute relevance value of the documents in a particular category and presenting the categories in the order of highest average.

At block 366, the subset of documents may be displayed in an order by highest relevance to the query, based on the absolute relevance score of each document of the subset of documents.

Optionally, at block 358, either during the original presentation of data or in response to a user request, an adjustment may be made to the absolute relevance score. For example, if a user indicates a preference for sorting by price, the price feature may be given extra importance, a process known as boost. Given the additional importance of, for example a feature, the machine learning categorization tool may be re-weighted, or alternatively, a pre-weighted machine learning categorization tool may be selected. The absolute relevance score for each document of the at least a portion of the set of documents may be regenerated based on the boosted characteristic. The subset of documents may also then be re-created using the regenerated absolute relevance score. The associated steps of selecting related refinements and displaying the documents may be re-performed.

Figure 4:
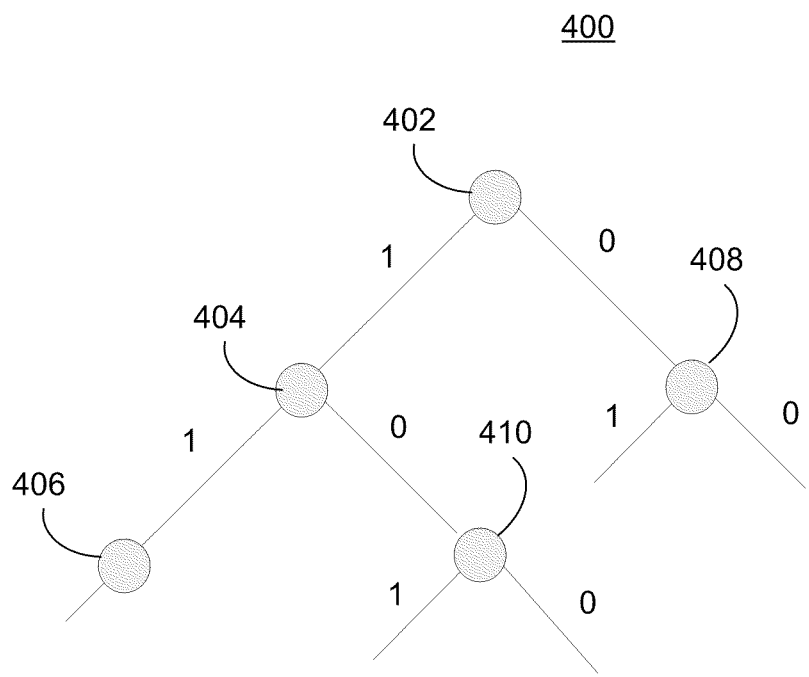
FIG. 4 is a diagram illustrating a portion of an exemplary decision tree.

FIG. 4 illustrates an exemplary tree search 400. Nodes 402, 404, 406, 408, and 410 may each be decision points associated with a particular feature. If the feature is present a value of 1 may be assigned and the branch to the left may be taken. If the feature is not present, a value of 0 may be assigned and the branch to the right may be taken. During the training, each node may be weighted to adjust the decision point for each node. Over a number of training runs, the weighting may be changed to determine which values give the best performance. Other criteria, such as how deep in the tree to cut off a search may also be adjusted to give results closer to that of a human judge.

Figure 5:
FIG. 5 illustrates a computer screen shot showing search results elements.

FIG. 5 illustrates an exemplary screen shot 500 of a search result. The search result may include documents (or document links) 502, 504, 506, and their respective descriptions and pictures, if available. Category listing 508 may show in rank order the categories to which the 1,230 documents belong. The selection of rank order is discussed above. Other categories such as brand 510 and price 512 are also displayed to the user. The selection of a category item will display those results having the selected characteristics, and in some embodiments, other items from that category. Features 514 are also displayed and may be selected to display the results according to the feature, such as listing by price or user rating.

The system and techniques described above provide a richer search experience to users performing a search, particularly a shopping search. Higher relevance searches save users time and effort and benefit the search engine provider by attracting more traffic. Ongoing efforts have seen over 10,000 sample queries used in training with hundreds of thousands of documents being rated and used to refine the machine learning categorization tool in an exemplary embodiment.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of displaying relevance ranked results on a computer used in Internet searching, comprising:
   generating a set of queries;
   executing each of the set of queries on an Internet search engine to develop a corresponding result set;
   selecting a limited number of documents from each corresponding result set;
   developing a subjective rating for each of the limited number of documents with respect to a subjective criteria, the subjective criteria including a count of clicks for each of the limited number of documents, the count of clicks decaying exponentially over time and including clicks where the query producing each document is unrelated to the generated set of queries;
   programming a machine learning categorization tool at least in part using the subjective rating of each of the limited number of documents;
   performing a query that returns a set of documents;
   generating an absolute relevance score for at least a portion of the set of documents using the machine learning categorization tool;
   creating a subset of documents from the at least a portion of the set of documents, each document in the subset of documents having its respective absolute relevance score above a threshold value;
   selecting one or more related refinements based on characteristics of documents in the subset of documents;
   displaying on the computer the one or more related refinements; and
   displaying on the computer the subset of documents in an order by highest relevance to the query based on the absolute relevance score of each document of the subset of documents.

2. The method of claim 1, further comprising:
   computing an inter judge agreement rate based on the subjective rating; and
   alerting the plurality of judges when the inter judge agreement rate falls below a limit.

3. The method of claim 1, wherein developing the subjective rating comprises assigning one of a bad, a fair, a good, and a perfect rating by each of the plurality of judges.

4. The method of claim 3, wherein each rating is assigned a numerical value with exponentially increasing values for each corresponding rating.

5. The method of claim 1, wherein selecting the limited number of documents from each corresponding result set comprises selecting a top 20 documents as designated by a relative ranker and another 80 documents selected from documents ranked 21-250 as designated by the relative ranker.

6. The method of claim 1, wherein selecting one or more related refinements comprises selecting at least one of a feature and a characteristic, wherein the feature comprises a user rating and the characteristic comprises a category, a price, and a brand.

7. The method of claim 1, wherein programming the machine learning categorization tool comprises programming a multiple additive regression tree (MART) tool.

8. The method of claim 1, wherein generating the set of queries comprises selecting the set of queries from a search engine log of actual user search queries.

9. The method of claim 1, further comprising:
   developing a boosted characteristic related to the at least a portion of the set of documents;
   re-generating the absolute relevance score for each document of the at least a portion of the set of documents based on the boosted characteristic; and
   re-creating the subset of documents with the regenerated absolute relevance score.

10. The method of claim 1, further comprising selecting the at least a portion of the set of documents from the set of documents based on a relative ranking process.

11. A computer-readable storage memory storing computer executable instructions executed by one or more processors of a computer implementing a method comprising:
   receiving criteria for implementing a query for documents;
   performing the query;
   receiving a set of documents resulting from the query;
   selecting a subset of the documents resulting from the query;
   generating an absolute relevance score for each document of the subset of the documents, the absolute relevance score being a function of human-generated labels and extrinsic data, the extrinsic data including a measure of query-independent popularity of a document of the set of documents, the popularity being determined based on a sum of clicks on the document;
   sorting the subset of the documents according to the absolute relevance score;
   selecting one or more related refinements based on characteristics of those documents of the subset of the documents with absolute relevance scores above a threshold value;
   displaying on the computer the one or more related refinements;
   presenting a list of related categories;

ordering the list of related categories with respect to an average absolute relevance that is calculated by taking an average absolute relevance of documents in each respective related category; and displaying on the computer those documents of the subset of the documents having respective absolute relevance scores above the threshold value, wherein recent clicks are given more weight than older clicks.

12. The computer-readable storage memory of claim 11, further comprising:

generating a set of test queries;

executing each of the set of test queries on an Internet search engine to develop a result set for each of the set of test queries;

selecting a limited number of documents from each result set based on a relative ranking;

developing a subjective rating for each of the limited number of documents with respect to a subjective criteria;

programming a machine learning categorization tool using the at least in part the subjective rating of each of the limited number of documents.

13. The computer-readable storage memory of claim 12, wherein developing the subjective rating comprises rating each document of the set of documents on a four point basis.

14. The computer-readable storage memory of claim 11, wherein the extrinsic data includes a title match and a click-through count.

15. The computer-readable storage memory of claim 11, wherein the extrinsic data includes a count of a number of phrases in a document of the set of documents that exactly match the query and a comparison of a category of the query to a category of the document.

16. The computer-readable storage memory of claim 11, wherein the extrinsic data includes a prediction of a likelihood that a document of the set of documents will be clicked.

17. The computer readable storage memory of claim 11, wherein the human-generated labels are derived from a subjective rating from each of a plurality of judges.

18. The method of claim 1, wherein developing the subjective rating for each of the limited number of documents comprises receiving the subjective rating from each of a plurality of judges rating each of the limited number of documents with respect to the subjective criteria.

19. A method of displaying relevance ranked results on a computer used in Internet searching, comprising:

receiving criteria for implementing a query for documents;

performing the query;

receiving a set of documents resulting from the query;

selecting a subset of the documents resulting from the query;

generating an absolute relevance score for each document of the subset of the documents, the absolute relevance score being a function of human-generated labels and extrinsic data, the extrinsic data including a measure of query-independent popularity of a document of the set of documents, the popularity being determined based on a sum of clicks on the document;

sorting the subset of the documents according to the absolute relevance score;

selecting one or more related refinements based on characteristics of those documents of the subset of the documents with absolute relevance scores above a threshold value;

displaying on the computer the one or more related refinements;

presenting a list of related categories;

ordering the list of related categories with respect to an average absolute relevance that is calculated by taking an average absolute relevance of documents in each respective related category; and displaying on the computer those documents of the subset of the documents having respective absolute relevance scores above the threshold value, wherein recent clicks are given more weight than older clicks.

* * * * *